US012782595B2

(12) United States Patent
Ma et al.

(10) Patent No.: US 12,782,595 B2
(45) Date of Patent: Nov. 3, 2026

(54) SYSTEM AND METHOD FOR REDUCING COHERENT AND RANDOM NOISE IN SEISMIC DATA

(71) Applicant: SAUDI ARABIAN OIL COMPANY, Dhahran (SA)

(72) Inventors: Yue Ma, Beijing (CN); Yujin Liu, Beijing (CN); Hongwei Liu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/145,287

(22) PCT Filed: Jan. 9, 2023

(86) PCT No.: PCT/CN2023/071243

§ 371 (c)(1), (2) Date: Jul. 2, 2025

(87) PCT Pub. No.: WO2024/148457

PCT Pub. Date: Jul. 18, 2024

(65) Prior Publication Data

US 2026/0219406 A1 Jul. 30, 2026

(51) Int. Cl.

*G01V 1/30* (2006.01)
*E21B 44/00* (2006.01)
*G01V 1/28* (2006.01)

(52) U.S. Cl.

CPC ................ *G01V 1/30* (2013.01); *E21B 44/00* (2013.01); *G01V 1/282* (2013.01); *E21B 2200/20* (2020.05)

(58) Field of Classification Search

CPC .......... G01V 1/30; G01V 1/282; E21B 44/00; E21B 2200/20

See application file for complete search history.

(56) References Cited

U.S. PATENT DOCUMENTS 4,951,266 A * 8/1990 Hsu .......................... G01V 1/48 367/43
5,392,213 A 2/1995 Houston et al.
(Continued)

FOREIGN PATENT DOCUMENTS

CN 104081226 A 10/2014
CN 110941015 A 3/2020

OTHER PUBLICATIONS

Al-Muhaidib, A.M., et al., "DrillCam: A fully integrated real-time system to image and predict ahead and around the bit," 88th Annual International Meeting, SEG, Expanded Abstracts, 719-723, 2018 (5 pages).
(Continued)

*Primary Examiner* — Steven A Macdonald
(74) *Attorney, Agent, or Firm* — Osha Bergman Watanabe & Burton LLP

(57) ABSTRACT

A method for reducing coherent and random noise in seismic data is disclosed. The method includes, obtaining a plurality of time-space waveforms (300) and generating a plurality of overlapping time-space windows by dividing the plurality of time-space waveforms (310). For each overlapping time-space window, the method further includes determining a transformed window from the time-space window (320), determining a coherent noise window from the transformed window by performing a first soft thresholding based on a predetermined parameter range (330), determining a random noise window from the transformed window by performing a second soft thresholding (340), and determining a time-space filtered window based, at least in part, on subtracting the coherent noise window and the random noise window from the overlapping time-space window (350), determining a plurality of time-space filtered waveforms by assembling the time-space filtered window for each of the plurality of (Continued)

overlapping time-space windows (360). It also includes a non-transitory computer readable memory and a system.

20 Claims, 6 Drawing Sheets

(56) References Cited

U.S. PATENT DOCUMENTS

| | | | | |
|---|---|---|---|---|
| 6,112,155 | A * | 8/2000 | Pham | G06T 15/10 702/14 |
| 6,393,365 | B1 | 5/2002 | Runnestrand et al. | |
| 2010/0260011 | A1* | 10/2010 | Berger | G01V 1/30 367/38 |
| 2010/0322030 | A1* | 12/2010 | Coman | G01V 1/42 367/27 |
| 2013/0155813 | A1* | 6/2013 | Huo | G01V 1/301 367/43 |
| 2015/0241584 | A1 | 8/2015 | Aarre | |
| 2017/0031047 | A1* | 2/2017 | Cheng | G01V 1/364 |
| 2018/0045845 | A1 | 2/2018 | Dumont et al. | |
| 2020/0057170 | A1 | 2/2020 | Schonewille et al. | |
| 2020/0209419 | A1 | 7/2020 | Zhou | |
| 2020/0271809 | A1 | 8/2020 | Al-Ali et al. | |
| 2021/0372258 | A1 | 12/2021 | Kazemi Nojadeh et al. | |
| 2021/0405236 | A1 | 12/2021 | Wang | |
| 2022/0260740 | A1* | 8/2022 | Bakulin | G01V 1/30 |
| 2022/0268957 | A1* | 8/2022 | Bakulin | G01V 1/36 |
| 2023/0306725 | A1* | 9/2023 | Wang | G01V 1/307 |
| 2023/0367027 | A1* | 11/2023 | Hampson | G01V 1/303 |

OTHER PUBLICATIONS

Bakulin, A., et al., "Seismic-while-drilling applications from the first DrillCAM trial with wireless geophones and instrumented top drive," The Leading Edge, 2020 (8 pages).

International Search Report issued for corresponding international patent application No. PCT/CN2023/071243, mailed Sep. 23, 2023 (4 pages).

Written Opinion issued for corresponding international patent application No. PCT/CN2023/071243, mailed Sep. 23, 2023 (4 pages).

Y. Ma, et al., "Suppression of coherent and random noise using adaptive thresholding method in seismic-while-drilling," Paper presented at the SEG/AAPG International Meeting for Applied Geoscience & Energy, Houston, Texas, USA, Aug. 2022 (5 pages).

* cited by examiner

SYSTEM AND METHOD FOR REDUCING COHERENT AND RANDOM NOISE IN SEISMIC DATA

BACKGROUND

A drill-bit seismic-while-drilling surface survey may be used to determine geological features within a subterranean region of interest. Seismic receivers on the surface record seismic waves generated by a drill bit while drilling a wellbore. The seismic waves may be recorded continuously and in real time. Seismic waves generated by the drill bit at depth may be weak, making it difficult to interpret the data acquired on the surface due to a low signal-to-noise ratio. A filtering scheme specialized in removing coherent and random noise may be used to enhance the signal-to-noise ratio of the acquired data. The denoised seismic waveforms may then be interpreted to identify the geological features within the subterranean region of interest, and to the identify the location of the drill bit in real time. Identification of the geological features may then be used to revise a wellbore trajectory as a wellbore is being drilled.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method including obtaining a plurality of time-space waveforms and generating a plurality of overlapping time-space windows by dividing the plurality of time-space waveforms. For each overlapping time-space window the method includes determining a transformed window from the time-space window. The method also includes determining a coherent noise window from the transformed window by performing a first soft thresholding based, at least in part, on a predetermined parameter range. The method further includes determining a random noise window from the transformed window by performing a second soft thresholding. The method includes determining a time-space filtered window based, at least in part, on subtracting the coherent noise window and the random noise window from the overlapping time-space window. The method still further includes determining a plurality of time-space filtered waveforms by assembling the time-space filtered window for each of the plurality of overlapping time-space windows.

In general, in one aspect, embodiments disclosed herein relate to a system including a well that penetrates a hydrocarbon reservoir, bored by a drilling rig and equipped with seismic-while-drilling sensors configured to record a plurality of time-space waveforms. The system also includes a signal processor configured to obtain the plurality of time-space waveforms and to generate a plurality of overlapping time-space windows by dividing the plurality of time-space waveforms. For each overlapping time-space window the signal processor is configured to determine a transformed window from the time-space window. The signal processor is also configured to determine a coherent noise window from the transformed window by performing a first soft thresholding based, at least in part, on a predetermined parameter range. The signal processor is further configured to determine a random noise window from the transformed window by performing a second soft thresholding. The signal processor is still further configured to determine a time-space filtered window based, at least in part, on subtracting the coherent noise window and the random noise window from the overlapping time-space window. The signal processor is also configured to determine a plurality of time-space filtered waveforms by assembling the time-space filtered window for each of the plurality of overlapping time-space windows.

Other aspects and advantages of the claimed subject matter will be apparent from the following description and the appended claims.

DETAILED DESCRIPTION

Figure 1:
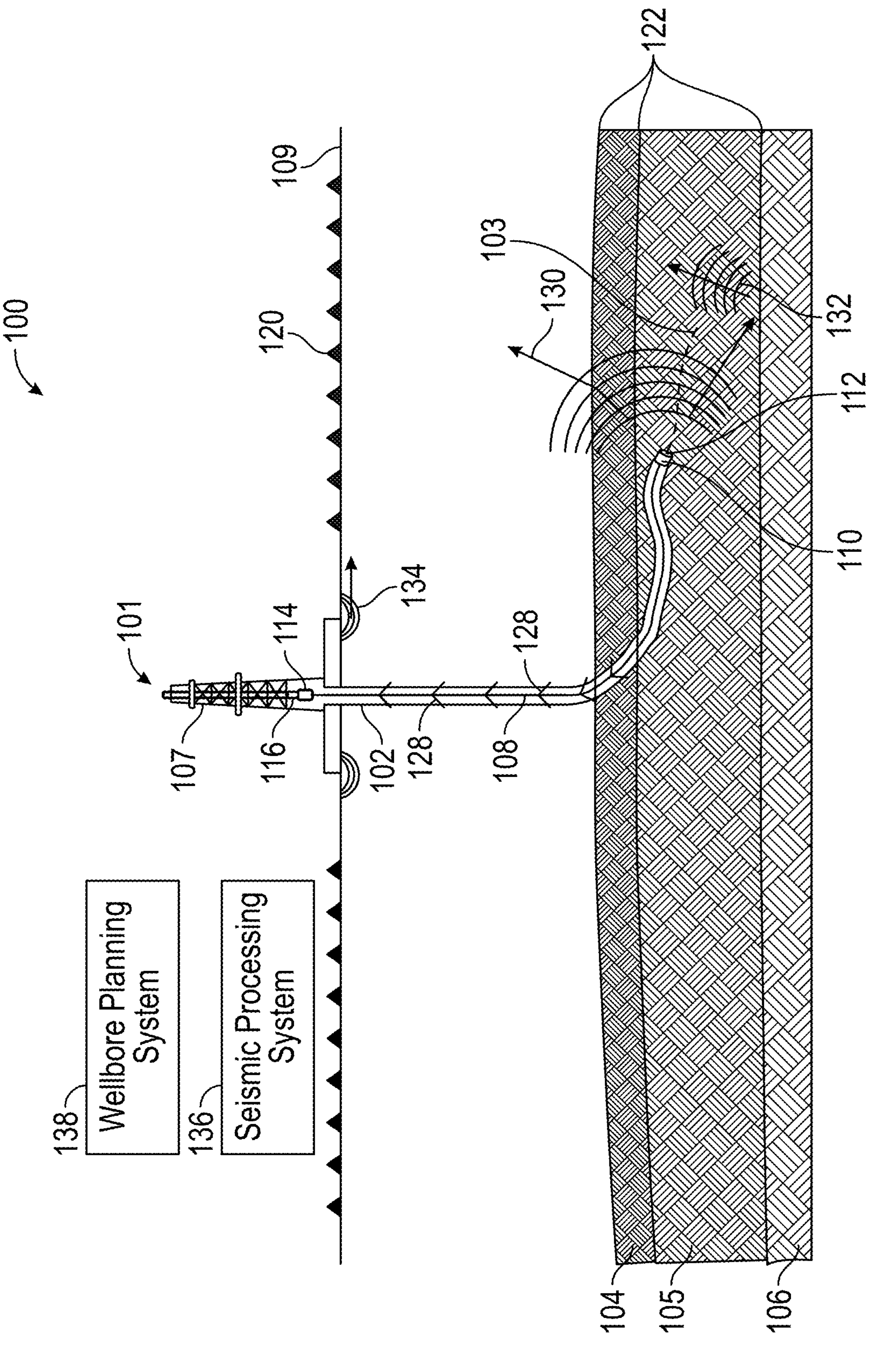
FIG. 1 illustrates a schematic seismic-while-drilling acquisition system disposed around at well site in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic signal" includes reference to one or more of such seismic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

In general, disclosed embodiments include systems and methods for reducing coherent and random noise from seismic data based on different soft thresholding operators. In particular, some embodiments use different criteria to identify and extract coherent and random noise from the seismic signals of interest. For example, coherent noise may be identified by its characteristic low frequency and low apparent velocity, whereas random noise may be identified by its presence in large temporal and spatial frequency bands. Furthermore, denoising may be performed in the frequency-wavenumber domain, where characteristics of noise are more easily distinguished. Effects of spectral leakage and amplitude smearing associated with filtering processes may be reduced by using soft thresholding. The resulting denoised seismic data may then be used for further seismic data interpretation, such as in updating time-depth models and seismic images.

Thus, the disclosed methods are integrated into the established practical applications for updating time-depth models and forming seismic images, that are themselves established processes integrated into the search for an extraction of hydrocarbon from subsurface hydrocarbon reservoirs. The disclosed methods represent an improvement over existing methods for at least the reasons of lower cost and increased efficacy.

Drill-bit seismic-while-drilling (SWD) is a data acquisition technology that uses seismic receivers placed on the surface to record seismic signals generated by the cutting action of a drill-bit while drilling a wellbore. The seismic signals are then interpreted to image the formations traversed by and around the wellbore, and to determine the position of the bit in real time. Because of the extensive use of Polycrystalline Diamond Compact (PDC) bits, which generate relatively weak seismic energy compared to other bit designs, such as roller-cone bits, the signals that arrive at the SWD receivers especially from deep bit locations may present a very low signal-to-noise ratio. Another reason for the low signal-to-noise ratio may be strong noise, such as the strong equipment-induced vibrations that propagate through the surface from the wellbore to the seismic receivers. Accordingly, in order to develop accurate seismic models from data acquired with SWD technology, data processing schemes for enhancing the low signal-to-noise ratio (S/N) may be implemented.

FIG. 1 shows a seismic-while-drilling acquisition system around at well site in accordance with one or more embodiments. In general, well sites may be configured in a myriad of ways. Therefore, the well site in FIG. 1 is not intended to be limiting with respect to the particular configuration of the drilling equipment. The well site is depicted as being on land. In other examples, the well site may be offshore, and drilling may be carried out with or without use of a marine riser. In marine locations the SWD receivers may be deployed on the seafloor.

The SWD acquisition system (100) may include a drilling system (101) configured to drill a wellbore (102), along a wellbore trajectory (103), into a subsurface including various formations (104, 105) to reach a hydrocarbon reservoir (106). The wellbore trajectory (103) may be a curved or a straight trajectory. All or part of the wellbore trajectory (103) may be vertical, and some wellbore trajectory (103) may be deviated or have horizontal sections.

For the purpose of drilling a new section of the wellbore (102), the drilling rig (107) may include a drillstring (108) attached to the drilling rig (107) located on the surface of the earth "surface" (109). The drillstring (108) may include one or more drill pipes connected to form conduit and a bottom hole assembly ("BHA") (110) disposed at the distal end of the conduit. The BHA (110) may include a drill bit (112) to cut into the subsurface rock. The BHA (110) may include measurement tools, such as a measurement-while-drilling (MWD) tool and logging-while-drilling (LWD) tool. Measurement tools may include sensors and hardware to measure downhole drilling parameters, and these measurements may be transmitted to the surface (109) using any suitable telemetry system known in the art. The BHA (110) and the drillstring (108) may include other drilling tools known in the art but not specifically shown.

During a drilling operation the drillstring (108) is rotated relative to the wellbore (102), and weight is applied to the drill bit (112) to enable the drill bit (112) to break rock as the drillstring (108) is rotated. In some cases, a top drive (114) may be coupled to the top of the drillstring (108) and is operable to rotate the drillstring (108). In further embodiments, the drill bit (112) may be rotated using a combination of a drilling motor and the top drive (114).

While cutting rock with the drill bit (112), drilling fluid (commonly called "mud") may flow into the drillstring (108) through appropriate flow paths in the top drive (114). The mud flows down the drillstring (108) and exits into the bottom of the wellbore (102) through nozzles in the drill bit (112). The mud in the wellbore (102) then flows back up to the surface in an annular space between the drillstring (108) and the wellbore (102) with entrained cuttings. Typically, the cuttings are removed from the mud, and the mud is reconditioned as necessary, before pumping the mud again into the drillstring (108).

While drilling, the cutting action of the drill bit (112) generates seismic waves. In one or more embodiments, the SWD acquisition system (100) may be used in real-time during a drilling operation to acquire seismic waves emitted by the drill bit (112) and transform them in usable seismic signals. As shown in FIG. 1, drill-bit generated seismic waves may be acquired by a plurality of surface sensors or "receivers" (120) disposed on the surface (109) around the drilling system (101), at a plurality of receiver stations. The plurality of receivers (120) may include conventional geophones (configured to measure ground motion velocity or acceleration), high sensitivity geophones, wireless geophones, or any other special sensors depending on the preferred array arrangements and acquisition requirements.

The number of receivers (120) may vary based on the sensors sensitivity to signal and noise.

Seismic waves acquired by receivers (120) in a SWD acquisition system (100) may include direct waves that propagate from the drill bit (112) to the receivers (120) without interaction with a subsurface formation. Other types of waves acquired by receivers (120) include refracted waves (130) and reflected waves (132) resulting from drill bit-generated seismic waves traversing discontinuities (122) of subsurface formations (104, 105). A person of ordinary skill in the art will appreciate that waves emitted by the drill bit (112) may propagate along other paths. Direct waves, refracted waves (130), and reflected waves (132) emitted by the drill bit (112) may be recorded by receivers (120) as a time series, typically referred to as a "waveform." The collection of waveforms recorded by the receivers (120) may be termed "SDW data".

In some embodiments, the drilling system (101) may be disposed at and communicate with other systems in the well environment. The drilling system (101) may control at least a portion of a drilling operation by providing controls to various components of the drilling operation. In one or more embodiments, the drilling system (101) may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus.

The receivers (120) may record and transmit, in real-time, drill bit generated seismic waves in the form of SDW data to a seismic processing system (136). The transmission may be performed using wired communication or wirelessly. The seismic processing system (136) may receive the SDW data and may be used to process the SDW data. This may include processing steps such as pre-processing, noise reduction, or attribute generation. Further, the seismic processing system (136) may be used to form a seismic image based on the processed seismic signals.

In particular, SWD data continuously recorded during drilling may be processed to be converted into standard impulse-like waveforms. The SWD data may be converted by deconvolving the waveforms with a pilot signal. In some embodiments, the pilot signal may be the drill-bit vibrations (128) transmitted through the drillstring (108) and may be recorded by top drive sensors (116). Specifically, the top drive sensors (116) may be one or more three-component accelerometers installed on the top drive (114) to record the drill-bit vibrations (128) induced into the drillstring (108). The top drive (114) rotates the drillstring (108), and the top drive sensors (116) may be configured to measure axial, torsional, and transverse vibrations of the drillstring (108). In another embodiment, the pilot signal may be drill-bit vibrations recorded near the drill-bit by downhole sensors. Downhole sensors may be, for example, three-components accelerograms installed in the BHA (110). Thus, in a SWD system (100), the top drive sensors (116) and/or the downhole sensors along with the receivers (120) at the surface (109) may constitute the "seismic-while-drilling sensors".

Drill bit-induced vibrations (128) transmitted along the drillstring (108) may appear to be random, highly variable, and not readily extractable from a single waveform of SWD data. In some embodiments, the pilot signal acquired by top drive sensors (116) may be pre-processed with autocorrelation and deconvolution operations followed by stacking over a predetermined drilling interval (for example, 30 ft, one drill-pipe length). Impulse-like waveforms may be then generated by correlation and deconvolution of the pre-processed pilot signal with data recorded by receivers (120). Stacking of the impulse-like waveforms over a predetermined drilling interval may be also performed to improve the quality of the signals. Furthermore, the resulting impulse-like waveforms may be provided in a "common shot gather" (CSG) domain, i.e., they may be sorted as waveforms acquired by different receivers and having a single source location. The source position may conveniently correspond to the current depth of the drill bit (112). The distance between each receiver (120) and the source is termed "the source-receiver offset".

In some embodiments, the seismic processing system (136) may be used to perform travel time analysis of direct or refracted waves (130) in SDW data to assess the location of the drill bit (112) to optimize drilling operations. Furthermore, subterranean features such as formations (104, 105) may manifest within the refracted and reflected waves of SDW data. Direct waves, refracted waves (130) and reflected waves (132) may carry information about the formations (104, 105) and discontinuities (122) through which they propagate. Certain discontinuities (122) may be further interpreted as indicative of the existence of a hydrocarbon reservoir (106) within the subterranean region of interest.

Knowledge of the existence and location of a hydrocarbon reservoir (106) and other subterranean features may be transferred to a wellbore planning system (138) to update a wellbore plan. The wellbore plan may include a wellbore trajectory (103) from the surface (109) to penetrate the hydrocarbon reservoir (106). The wellbore plan may have been generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. The wellbore plan may be updated during the drilling of the wellbore (102). For example, the wellbore plan may be updated based upon new data about the condition of the drilling equipment, and about the formations (104, 105) through which the wellbore (102) is drilled. The wellbore planning system (138) may transfer information regarding the updated wellbore trajectory (103) to the drilling system (101) described in FIG. 1. The drilling system (101) may drill the wellbore (102) along the wellbore trajectory (104) to access the hydrocarbon reservoir (106).

As shown in FIG. 1, the receivers (120) that are mounted on the surface to receive seismic waves from the drill bit (112), may receive other types of seismic waves transferred to the surface by the drilling rig (107). The rotation of the drill bit (112) induces drill-bit vibrations (128) that propagate along the drillstring (108) and reach the surface through the drilling rig (107). Other sources of vibrations include vehicles, generators, mud pumps, shale shakers, and other equipment at the drilling rig (107). Part of the drilling vibrations is radiated to the surface (109) in the form of surface waves (134) propagating away from the wellbore as a conversion point. Surface waves may include Rayleigh waves (also known as "ground roll" due to their elliptical particle movement), which are low-frequency dispersive waves, that propagate with low phase velocities. Since similar phases of ground roll are found in the waveforms recorded at different neighboring receivers, ground roll phases are considered "coherent waves".

As ground roll propagates along the surface it may reach and be recorded by the receivers (120) of the SWD acquisition system (100), and ground roll phases may be present in the SWD data. However, ground roll phases may be seismic waves that have not traversed or been affected by the formations (104, 105), and may be considered as unwanted noise in the SWD data. Furthermore, because ground roll may be much stronger in amplitude than the direct, refracted and reflected waves, ground roll may be considered as the main type of "coherent noise" in SWD data. Other types of coherent noise, such as air wave in land data, and guided waves in shallow marine data, may be also abundant in SWD data and obscure the seismic waves of interest, especially in areas with complex geological structures.

Random noise may also be recorded by the receivers (120) of the SWD acquisition system (100) and be present in the SWD data. Random noise is spatially uncorrelated noise generated by environmental activities, such as acquisition devices, drilling rig operations, vessels, and wind, among others. Unlike coherent noise, the energy of random noise may be distributed in a broad range of frequencies and in numerous directions of propagation. Furthermore, random noise may exhibit different characteristics in different frequency bands.

Since drilling operations may be accompanied by strong vibrations, a high level of noise, coherent and/or random may be present in SWD data. On the other hand, the seismic waves generated at depth by the bit may be significantly attenuated when propagating to the surface through the formations, and the direct, refracted and reflected waves arriving to the receivers may be rather weak. SWD data acquired under such conditions may then require careful and extensive processing for interpretation. Many of the seismic processing and imaging techniques, such as deconvolution, migration, and inversion are more effective when applied to data with high signal-to-noise ratio. When random and coherent noise are not removed properly, these techniques may fail to provide accurate results. Specialized techniques and workflows may be required for correct processing and interpretation of SWD data. Conventional noise reduction methods exploit the differences between the noise and the seismic waves of interest. For example, coherent noise often propagates across the receivers with apparent velocities that are slower than the seismic waves of interest. Therefore, coherent noise, such as ground roll and air wave, may be characterized as low-velocity events with high amplitudes.

Figure 2:
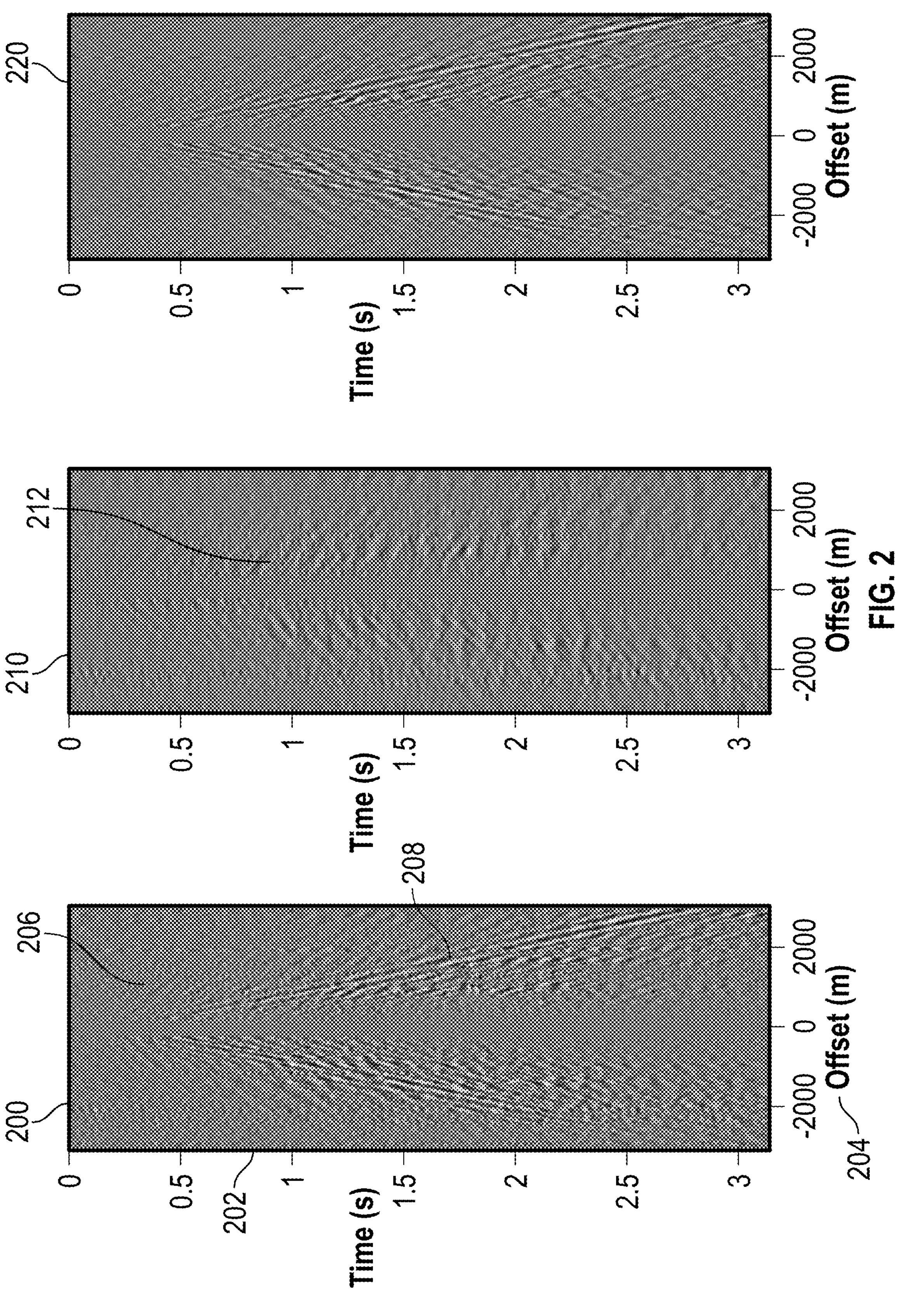
FIG. 2 shows examples of noise and denoised common shot gathers in accordance with one or more embodiments.

FIG. 2 shows an example of a common shot gather (CSG) (200) with strong noise content in accordance with one or more embodiments. The CSG (200) displays a plurality of waveforms created by the reception of the direct, refracted and reflected waves emitted by the drill bit (112). The vertical axis indicates the travel time (202) in seconds, and the horizontal axis indicates the source-receiver offset (204). The CSG (200) shows a direct-arrival event (206) and the presence of very energetic coherent noise (208). Furthermore, the angle measured from horizontal axis ("the dip") of the coherent noise is much steeper than the dip of the direct-arrival event (206). As the CSG (200) provides the change in time of the waveforms in the direction of the source-receiver offset, the dip indicates an "apparent velocity" of the seismic waves. Therefore, events in a CSG (200) with a steeper dip would be associated with seismic waves or noise with a lower apparent velocity of propagation. As seen, the energetic coherent noise present in the CSG (200) significantly complicates the identification and interpretation of the seismic waves of interest.

Figure 3:
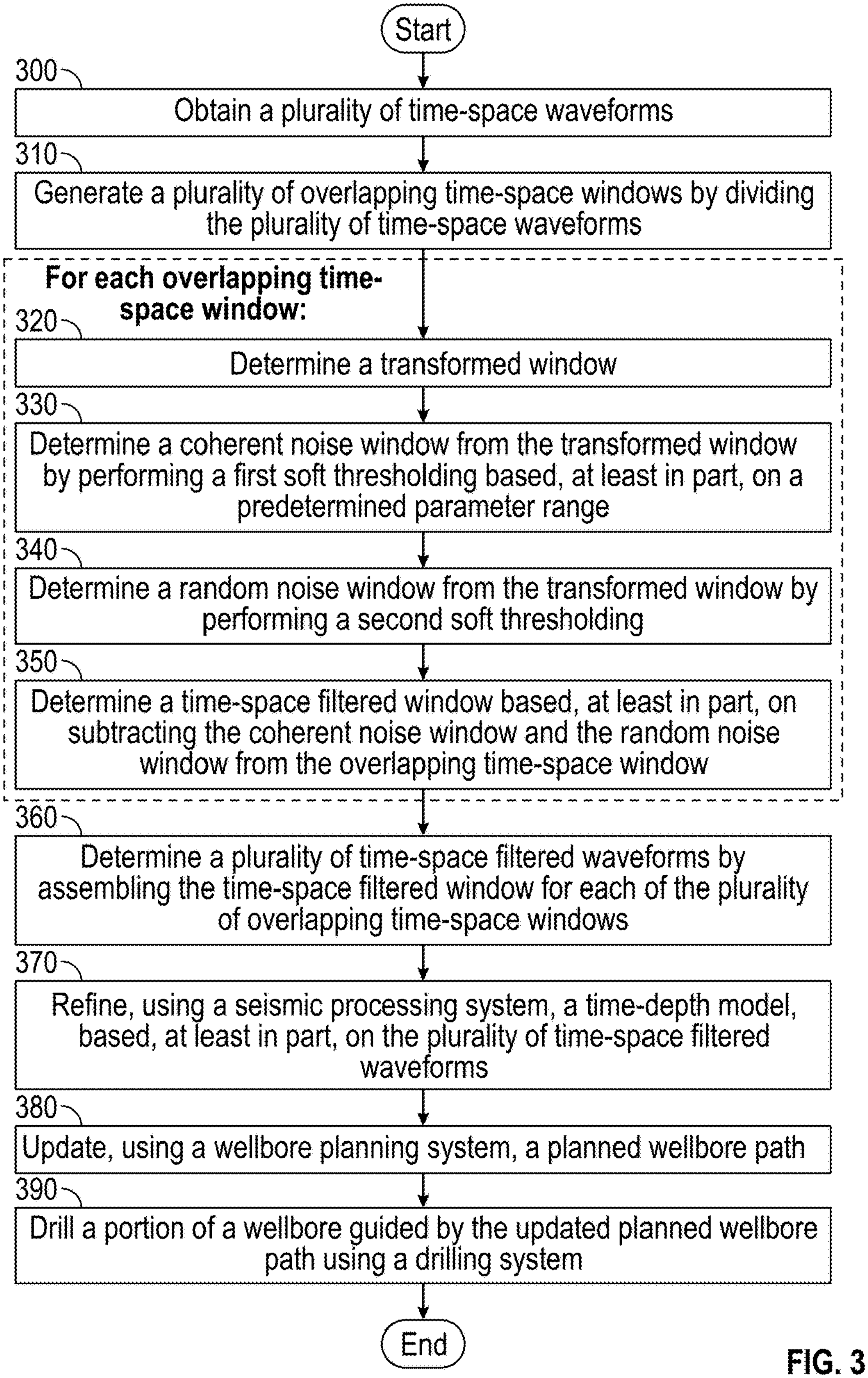
FIG. 3 shows a flowchart in accordance with one or more embodiments.

Turning to FIG. 3, FIG. 3 shows a flowchart in accordance with one or more embodiments. Specifically, FIG. 3 describes a general method for noise reduction from waveform data. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a plurality of time-space waveforms is obtained in accordance with one or more embodiments. The plurality of time-space waveforms may include seismic-while-drilling waveforms. Specifically, in a SWD acquisition system (100) seismic waves generated at depth by the drill-bit that propagate to the surface through one or more formations may be recorded by a plurality of receivers using continuous real-time recording. Signals generated by a drill-bit source and propagated through the drillstring (108) may be recorded passively by the top drive sensors (116) on the surface. A pilot signal may be extracted from the signals recorded by the top drive sensors (116). A sequence of impulse-like waveforms may be then generated by continuously deconvolving the signals recorded at the receivers with the estimated pilot. In some embodiments, the SWD waveforms are obtained by stacking the recordings over a drilling interval (for example, of 32 ft length, or, of a drill pipe length). Furthermore, a common-shot gather (CSG) may be generated with the source position corresponding to the middle of the drilling interval, as the example of FIG. 2.

In Block 310, a plurality of overlapping time-space windows may be generated by dividing the plurality of time-space waveforms, in accordance with one or more embodiments. By generating a plurality of overlapping time-space windows and processing each of the overlapping windows independently, processing time and costs may be reduced. Each time-space window $d_i(t, x)$ may be assumed to consist of three additive time-space components:

$$d_i(t, x) = u(t, x) + n_c(t, x) + n_r(t, x) \quad (1)$$

where u(t, x) corresponds to the waveforms of interest ("time-space filtered window"), $n_c(t, x)$ is a time-space coherent noise window, and $n_r(t, x)$ is a time-space random noise window.

Figure 4:
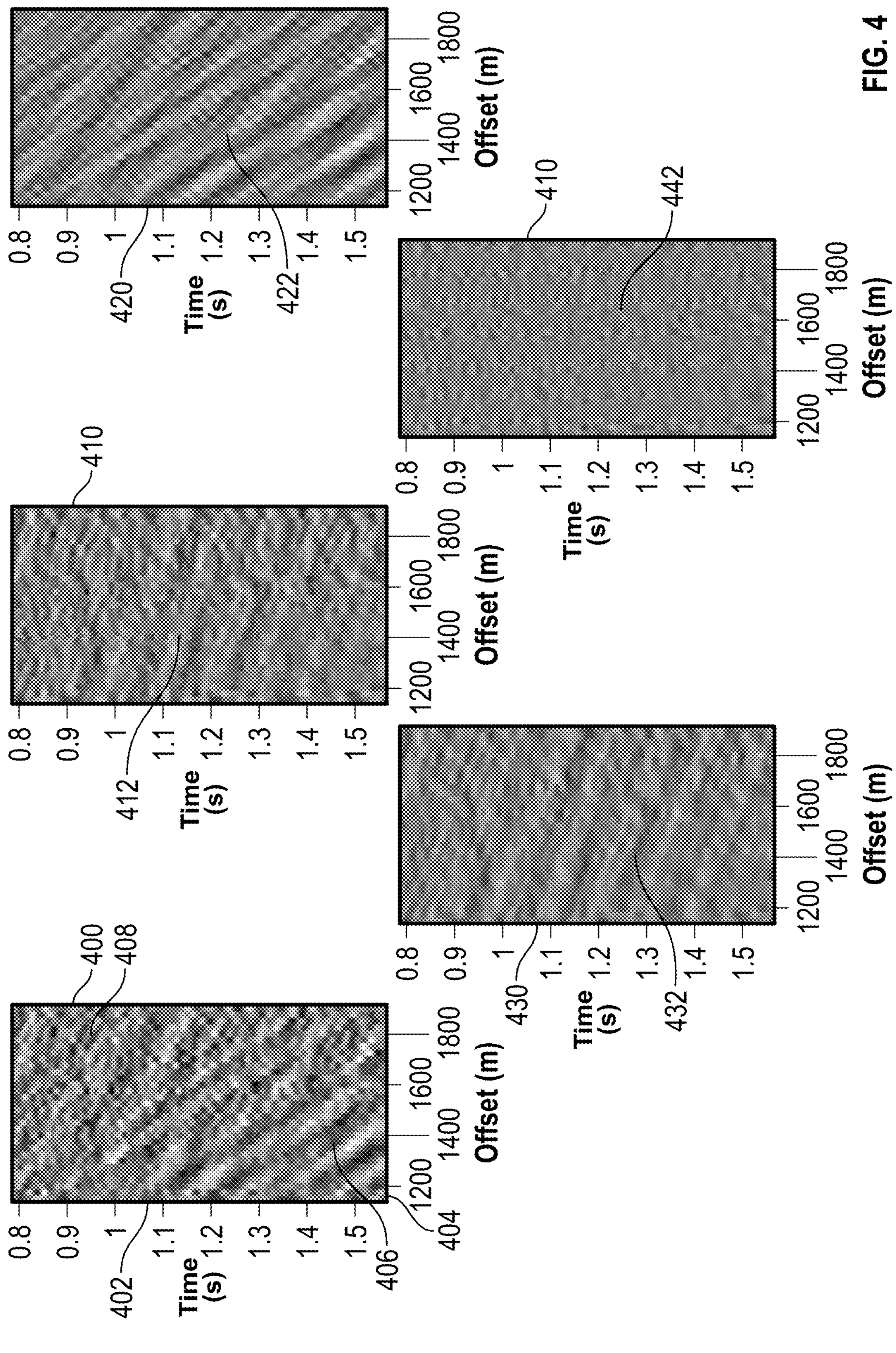
FIG. 4 illustrates examples of noise and denoised time-space windows in accordance with one or more embodiments.

FIG. 4 illustrates examples of noise and denoised time-space windows in accordance with one or more embodiments. In particular, FIG. 4 includes an example of a time-space window (400) extracted from the CSG (200) of FIG. 2. The vertical axis indicates the travel time (402) in seconds, and the horizontal axis indicates the source-receiver offset (404). Each of the waveforms of the time-space window (400) has been normalized with respect to its maximum amplitude. Once again, strong coherent noise (406) is observed with a dip steeper than that of the weaker waveforms of interest (408).

In Block 320, a transformed window from the time-space window is determined for each overlapping time-space window, in accordance with one or more embodiments. Each time-space window $d_i(t, x)$ may be transformed into a transformed window D(f, k) in the frequency-wavenumber domain by a 2D Fourier Transform. Each element of the transformed window D(f, k) may then be a complex number, i.e., it has an amplitude, and a phase.

Transforming each of the overlapping time-space windows $d_i(t, x)$ to the frequency-wavenumber domain may facilitate the reduction of noise present in the SWD data, since the seismic waves of interest and the coherent noise are characterized by different dips. Furthermore, whereas coherent noise energy concentrates in a narrow, low-frequency bands, random noise energy is distributed across all frequency bands. Thus, separation of coherent noise and random noise may be more easily performed in the frequency-wavenumber domain.

Figure 5:
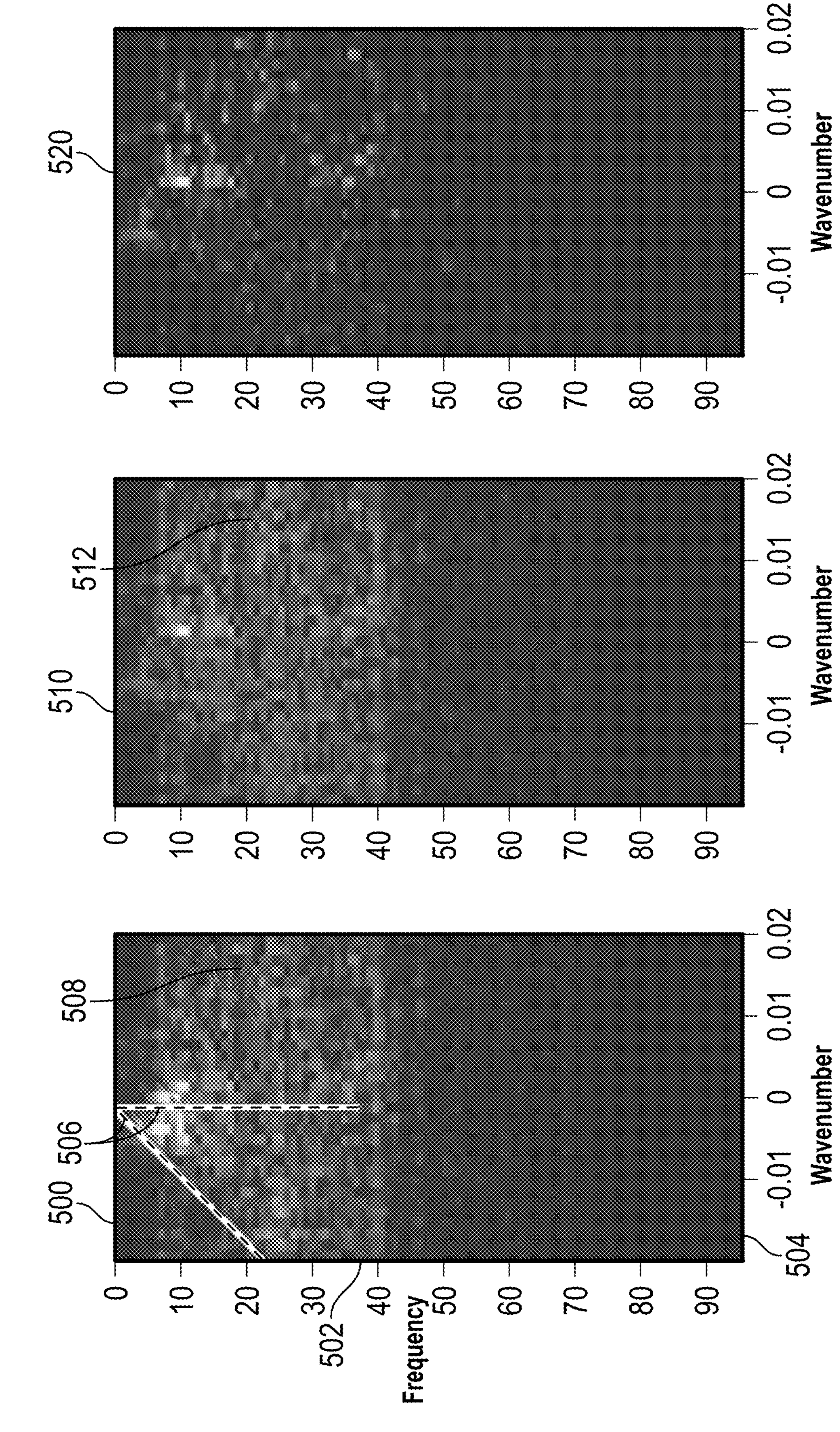
FIG. 5 illustrates examples of noise and denoised frequency-wavenumber windows in accordance with one or more embodiments.

FIG. 5 illustrates examples of noise and denoised frequency-wavenumber windows in accordance with one or more embodiments. In particular, FIG. 5 includes an example of a transformed window D(f, k) (500) obtained by decomposing the time-space window $d_i(t, x)$ (400) of FIG. 4 using the 2D Fourier Transform. The vertical axis (502) indicates the frequency, and the horizontal axis (504) indicates the wavenumber. As seen in FIG. 5, the transformed window D(f, k) (500) provides information on the distribution of energy in terms of frequency and apparent velocities. For the example of the transformed window D(f, k) (500), linear events of low apparent velocity are observed within the sector area limited by the two white dashed lines (506). Those linear events correspond to strong coherent noise present in the transformed window (500). On the other hand, energy of low amplitude and distributed over a large range of frequencies and wavenumbers corresponding to random noise (508), is also observed in the transformed window D(f, k) (500).

In accordance with one or more embodiments, in Block 330, a coherent noise window is determined from the transformed window by performing a first soft thresholding based, at least in part, on a predetermined parameter range. Coherent noise may be identified in the transformed window based on the low apparent velocity of the coherent noise. A predetermined apparent velocity range $[v_{min}, v_{max}]$ may be obtained, where $v_{min}$ and $v_{max}$ are the minimum and maximum apparent velocities associated with the coherent noise present in the transformed window. For each apparent velocity $v \in [v_{min}, v_{max}]$, and any zero-offset time $t_0$, the trajectory of a linear (dipping) event may be expressed as $$t = t_0 + \frac{x}{v} \quad (2)$$

In the frequency-wavenumber domain, the trajectory corresponds to an angular ray passing though the origin:

$$f = -vk \quad (3)$$

A sector of coherent noise $D_v(f, k)$ may be determined from the transformed window D(f, k) for each identified linear event of coherent noise and associated velocity range $[v_{min}, v_{max}]$, as follows:

$$D_v(f, k) = D(-vk, k),\ v \in [v_{min}, v_{max}] \quad (4)$$

The sector $D_v(f, k)$ is then bounded by the two rays $f=-v_{min}k$ and $f=-v_{max}k$.

For each identified linear even of coherent noise, a first soft thresholding operator $\mathfrak{J}_v$ based on amplitude of the sector $D_v(f, k)$ may be determined, according to one or more embodiments. The first soft thresholding operator $\mathfrak{J}_v$ may be based on a difference between the amplitude of the transformed window $D_v(f, k)$ and a predetermined threshold value. For example, the first soft thresholding operator $\mathfrak{J}_v$ may be designed to attenuate amplitudes of $D_v(f, k)$ that lie above a predetermined threshold value, in order to attenuate the coherent noise present in the transformed window D(f, k). Amplitudes of $D_v(f, k)$ that are farther from the predetermined threshold value are more attenuated than the amplitudes of $D_v(f, k)$ that are closer to the predetermined threshold value. Alternatively, the first soft thresholding operator $\mathfrak{J}_v$ may be designed to extract the amplitudes of $D_v(f, k)$ that lie above a predetermined threshold value, in order to obtain a coherent noise window $N_c(f, k)$. The use of a soft thresholding operator in the frequency-wavenumber domain may reduce the amount of spectral leakage associated with strong discontinuities in the spectral amplitudes that may result after removing noise. To further reduce the effect of spectral leakage, before applying the first soft thresholding operator $\mathfrak{J}_v$, spikes in the amplitude of the sector $D_v(f, k)$ maybe filtered out with a window-sliding median filter along each apparent velocity v. Additionally, a bandpass filter may be used to filter the sector $D_v(f, k)$ in order to limit the bandwidth of the identified coherent noise.

Based on the first soft thresholding operator $\mathfrak{J}_v$, a residual window $\tilde{D}(f, k)$ may be obtained as well from attenuating the coherent noise from the transformed window D(f, k). Even though the first soft thresholding operator $\mathfrak{J}_v$ is based on the amplitude of $D_v(f, k)$, the coherent noise window $N_c(f, k)$ and the residual window $\tilde{D}(f, k)$ are determined by attenuating both, the amplitude and the phase of the transformed window D(f, k).

Turning to FIG. 4, FIG. 4 includes examples of a time-space residual window $\tilde{d}(t, x)$ (410) and a time-space coherent noise window $n_c(t, x)$ (420). The two windows have been determined from the time-space window $d_i(t, x)$ (400), using a first soft thresholding operator $\mathfrak{J}_v$. Comparison of the time-space window $d_i(t, x)$ (400) with the time-space residual window $\tilde{d}(t, x)$ (410) illustrates that the proposed technique effectively attenuates coherent noise without modifying the seismic waves of interest. In the time-space residual window $\tilde{d}(t, x)$ (410) the waveforms of interests (412), generated continuously by the cutting action of the drill bit, and propagating with higher apparent velocity (relative to coherent noise) are more clearly visualized. On the other hand, the time-space coherent noise window $n_c(t, x)$ (420) illustrates the also continuous, but lower frequency and lower apparent velocity phases (422) of coherent noise (mainly composed of ground roll).

Returning to FIG. 5, FIG. 5 includes the residual window $\tilde{D}(f, k)$ (510) obtained from transforming the time-space residual window $\tilde{d}(t, x)$ (410) into the frequency-wavenumber domain. As seen, the linear events previously identified in the transformed window D(f, k) (500), associated with coherent noise, are not present in the residual window $\tilde{D}(f, k)$ (510). However, the random noise (508) present in the transformed window D(f, k) (500), has remained in the residual window $\tilde{D}(f, k)$ (510), with the same amplitudes and distribution (512) over the frequency-wavenumber domain. It is evident that the criteria used herein for attenuating coherent noise does not affect the random noise present in the transformed window D(f, k) (500). Since coherent noise and random noise have different characteristics in the frequency-wavenumber domain, different criteria may be used for attenuating them effectively.

In Block 340, a random noise window is determined from the transformed window by performing a second soft thresholding, in accordance with one or more embodiments. Unlike coherent noise, random noise energy is distributed over most frequencies and wavenumbers. Furthermore, random noise may exhibit different characteristics in different frequency bands. Thus, in some embodiments, the second soft thresholding operator $\mathfrak{I}_f$ to extract random noise may be a function of frequency. In a non-limiting example, the second soft thresholding operator $\mathfrak{I}_f$ may be defined for a plurality of frequency ranges (e.g., 5-20 Hz, 21-35 Hz, 36-50 Hz). A random noise threshold value may be determined for each frequency range to generate a plurality of random noise threshold values. Thus, the plurality of random noise threshold values may be a function of frequency. Furthermore, the plurality of random noise threshold values may be based on a combination of amplitudes of the residual window $\tilde{D}(f, k)$. For example, the random noise threshold values may be based on the average amplitude of random noise within the corresponding frequency range.

Based on the second soft thresholding operator $\mathfrak{I}_f$, a random noise window $N_r(f, k)$ may be extracted from the residual window $\tilde{D}(f, k)$. The random noise window $N_r(f, k)$ may be extracted by applying the second soft thresholding operator $\mathfrak{I}_f$ to attenuate both the amplitude and the phase of the residual window $\tilde{D}(f, k)$. Further, the time-space random noise window $n_r(t, x)$ may be obtained by transforming the random noise window $N_r(f, k)$ with inverse Fourier Transforms.

Returning to FIG. 4, FIG. 4 includes an example of a time-space random noise window (440), according to some embodiments. The time-space random noise window $n_r(t, x)$ (440) has been determined by applying the second soft thresholding operator $\mathfrak{I}_f$ to the residual window $\tilde{D}(f, k)$. The resulting time-space random noise window $n_r(t, x)$ (440) shows random noise (442) with small amplitudes distributed over all frequencies and without any characteristic apparent velocity (or dip). Thus, waveforms of interest that may be more energetic than coherent noise, may not be severely affected by the second soft thresholding operator $\mathfrak{I}_f$ applied to extract random noise.

In Block 350, a time-space filtered window is determined based, at least in part, on subtracting the coherent noise window and the random noise window from the overlapping time-space window, in accordance with one or more embodiments. The coherent noise window $N_c(f, k)$ and the random noise window $N_r(f, k)$ may be first transformed to the time-offset domain, by 2D inverse Fourier Transforms. Then, the time-space filtered window u(t, x) may be obtained by subtracting from the overlapping time-space window $d_i(t, x)$, the time-space coherent noise window $n_c(t, x)$ and the time-space random noise window $n_c(t, x)$. In some embodiments, the time-space filtered window u(t, x) is obtained using adaptive subtraction. Adaptive subtraction may include using a time-varying least-square Wiener filter. The Wiener filter may adapt the amplitude and phase of the coherent noise window $N_c(f, k)$ and the random noise window $N_r(f, k)$ before performing the subtraction.

FIG. 4 includes a time-space filtered window u(t, x) (430) obtained by subtracting the coherent noise and the random noise from the overlapping time-space window (400) $d_i(t, x)$. Comparing windows (400) and (430) it is apparent that the time-space filtered window u(t, x) (430) is less noisy, and the characteristics of the waveforms of interest are more clearly visualized. For example, the sloping lines dipping from left to right (432) clearly indicate the periodic seismic waves continuously arriving at the receivers.

Turning to FIG. 5, FIG. 5 includes a filtered transformed window U(f, k) (520), according to some embodiments. The filtered transformed window U(f, k) (520) has been obtained by transforming the time-space filtered window u(t, x) (430) using the 2D Fourier Transform. It will be readily apparent to one of ordinary skill in the art that the filtered transformed window U(f, k) (520) is noticeably less noisy than transformed window D(f, k) (500) from which it was derived. In particular, the amplitudes and distribution of the random noise (512) that was still present in the residual window $\tilde{D}(f, k)$ (510) has been significantly reduced in the filtered transformed window U(f, k) (520).

In Block 360, a plurality of time-space filtered waveforms is determined by assembling the time-space filtered window for each of the plurality of overlapping time-space windows, in accordance with one or more embodiments. The plurality of time-space filtered waveforms should then correspond to the denoised seismic energy of interest. FIG. 2 includes an example of a denoised CSG (210), obtained from removing the coherent noise and the random noise from the CSG (200) with the steps described in FIG. 3. The removed coherent noise and random noise are shown in (220). The waves generated by the drill bit while drilling (212) and that continuously arrive to the receivers via the subterranean formations are readily discernable in the denoised CSG (210). When comparing the CSG (210) and the removed noise (220) it is again clear that the coherent noise and the waveforms of interest and have different apparent velocities.

The filtering technique for reducing coherent and random noise described in FIG. 3 shows to be effective on denoising SWD data. It may be an effective denoising technique for data associated with highly complex geological formations with conflicting dips and/or steeply dipping coherent noise. Application of the proposed filtering technique with soft thresholding operations reduces the effect of spectral leakage. Furthermore, the use of overlapping time-space windows allows for filtered results with minimum spatial-amplitude smearing.

In Block 370, a, a time-depth model is refined using a seismic processing system based, at least in part, on the plurality of time-space filtered waveforms, in accordance with one or more embodiments. The seismic processing system (136) may be configured to collect the plurality of time-space filtered waveforms to refine a time-depth curve for calibration of previously generated seismic images. According to some embodiments, picked travel times from filtered SWD data may be used to calibrate a time-depth model for one or more wellbores.

A conventional survey to generate a time-depth model includes inducing seismic waves at the surface and recording them by sensors clamped to the wellbore walls. The data recorded with conventional surveys, and therefore time-depth models, are only available for interpretation after drilling operations, or from a very small number of depths recorded during breaking in drilling operations, for example when worn drill bits are replaced. With SWD data, a time-depth model may be recalibrated in real time, and the bit can be more accurately located in a seismic image. Furthermore, real-time time-depth models may reduce pre-drilling depth uncertainty for key formations and may provide a more accurate selection of casing points for drilling.

In Block 380, a planned wellbore trajectory is updated using a wellbore planning system based, at least in part, on the time-depth model, in accordance with one or more embodiments. The seismic processing system (136) may be configured to use the time-depth model to update the location of a hydrocarbon reservoir (106) and other formations (104, 105). Knowledge of the location of the hydrocarbon reservoir (106) and other formations (104, 105) may then be transferred to the wellbore planning system (138). The wellbore planning system (138) may be located in the memory (609) within the computer system (600) described in FIG. 6 below. The wellbore planning system (138) uses the knowledge of the manifestation of the hydrocarbon reservoir (106) and other formations (104, 105) to update a wellbore trajectory (103) within the subterranean region of interest. The updated wellbore trajectory (103) may be influenced by shallow drilling hazards, such as gas pockets, subterranean water flows, and/or unstable/metastable fault zones.

In Block 390, a portion of a wellbore is drilled using a drilling system and guided by the updated planned wellbore trajectory, in accordance with one or more embodiments. The updated wellbore trajectory (103) may be transferred to the drilling system (101) described in FIG. 1. The drilling system (101) may drill the wellbore (102) along the updated well trajectory (103) to access and produce the hydrocarbon reservoir (106) to the surface (109). Furthermore, the drilling system (101) may continue drilling the wellbore (102) along the updated wellbore trajectory (103) to obtain additional SWD data, such that steps (300) through (308) described in FIG. 3 may be repeated to ultimately access and produce the hydrocarbon reservoir (106).

Figure 6:
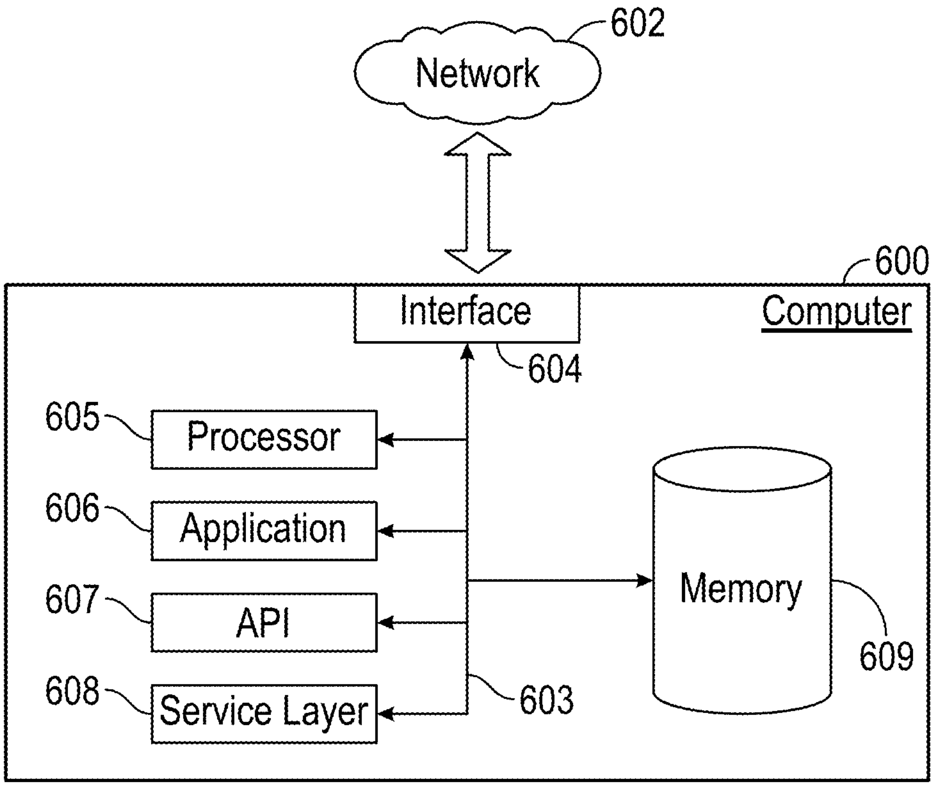
FIG. 6 illustrates a block diagram of a computer system in accordance with one or more embodiments.

In some embodiments the seismic processing system (136) and the wellbore planning system (138) may include a computer system. FIG. 6 is a block diagram of a computer system (600) used to provide computational functionalities associated with described algorithms, methods, functions, processes, flows, and procedures as described in the instant disclosure, according to an implementation. The illustrated computer (600) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (600) may include a computer that includes an input device, such as a keypad, keyboard, touch screen, or other device that can accept user information, and an output device that conveys information associated with the operation of the computer (600), including digital data, visual, or audio information (or a combination of information), or a GUI.

The computer (600) can serve in a role as a client, network component, a server, a database or other persistency, or any other component (or a combination of roles) of a computer system for performing the subject matter described in the instant disclosure. The illustrated computer (600) is communicably coupled with a network (602). In some implementations, one or more components of the computer (600) may be configured to operate within environments, including cloud-computing-based, local, global, or other environment (or a combination of environments).

At a high level, the computer (600) is an electronic computing device operable to receive, transmit, process, store, or manage data and information associated with the described subject matter. According to some implementations, the computer (600) may also include or be communicably coupled with an application server, e-mail server, web server, caching server, streaming data server, business intelligence (BI) server, or other server (or a combination of servers).

The computer (600) can receive requests over network (602) from a client application (for example, executing on another computer (600)) and responding to the received requests by processing the said requests in an appropriate software application. In addition, requests may also be sent to the computer (600) from internal users (for example, from a command console or by other appropriate access method), external or third-parties, other automated applications, as well as any other appropriate entities, individuals, systems, or computers.

Each of the components of the computer (600) can communicate using a system bus (603). In some implementations, any or all of the components of the computer (600), both hardware or software (or a combination of hardware and software), may interface with each other or the interface (604) (or a combination of both) over the system bus (603) using an application programming interface (API) (607) or a service layer (608) (or a combination of the API (607) and service layer (608). The API (607) may include specifications for routines, data structures, and object classes. The API (607) may be either computer-language independent or dependent and refer to a complete interface, a single function, or even a set of APIs. The service layer (608) provides software services to the computer (600) or other components (whether or not illustrated) that are communicably coupled to the computer (600). The functionality of the computer (600) may be accessible for all service consumers using this service layer (608). Software services, such as those provided by the service layer (608), provide reusable, defined business functionalities through a defined interface. For example, the interface may be software written in JAVA, C++, or other suitable language providing data in extensible markup language (XML) format or other suitable format. While illustrated as an integrated component of the computer (600), alternative implementations may illustrate the API (607) or the service layer (608) as stand-alone components in relation to other components of the computer (600) or other components (whether or not illustrated) that are communicably coupled to the computer (600). Moreover, any or all parts of the API (607) or the service layer (608) may be implemented as child or sub-modules of another software module, enterprise application, or hardware module without departing from the scope of this disclosure.

The computer (600) includes an interface (604). Although illustrated as a single interface (604) in FIG. 6, two or more interfaces (604) may be used according to particular needs, desires, or particular implementations of the computer (600). The interface (604) is used by the computer (600) for communicating with other systems in a distributed environment that are connected to the network (602). Generally, the interface (604) includes logic encoded in software or hardware (or a combination of software and hardware) and operable to communicate with the network (602). More specifically, the interface (604) may include software supporting one or more communication protocols associated with communications such that the network (602) or interface's hardware is operable to communicate physical signals within and outside of the illustrated computer (600).

The computer (600) includes at least one computer processor (605). Although illustrated as a single computer processor (605) in FIG. 6, two or more processors may be used according to particular needs, desires, or particular implementations of the computer (600). Generally, the computer processor (605) executes instructions and manipulates data to perform the operations of the computer (600) and any algorithms, methods, functions, processes, flows, and procedures as described in the instant disclosure.

The computer (600) also includes a memory (609) that holds data for the computer (600) or other components (or a combination of both) that may be connected to the network (602). For example, memory (609) may be a database storing data consistent with this disclosure. Although illustrated as a single memory (609) in FIG. 6, two or more memories may be used according to particular needs, desires, or particular implementations of the computer (600) and the described functionality. While memory (609) is illustrated as an integral component of the computer (600), in alternative implementations, memory (609) may be external to the computer (600).

The application (606) is an algorithmic software engine providing functionality according to particular needs, desires, or particular implementations of the computer (600), particularly with respect to functionality described in this disclosure. For example, application (606) can serve as one or more components, modules, applications, etc. Further, although illustrated as a single application (606), the application (606) may be implemented as multiple applications (606) on the computer (600). In addition, although illustrated as integral to the computer (600), in alternative implementations, the application (606) may be external to the computer (600).

There may be any number of computers (600) associated with, or external to, a computer system containing computer (600), each computer (600) communicating over network (602). Further, the term "client," "user," and other appropriate terminology may be used interchangeably as appropriate without departing from the scope of this disclosure. Moreover, this disclosure contemplates that many users may use one computer (600), or that one user may use multiple computers (600).

In some embodiments, the computer (600) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:

obtaining a plurality of time-space waveforms;

generating a plurality of overlapping time-space windows by dividing the plurality of time-space waveforms;

for each overlapping time-space window:

determining a transformed window from the time-space window, determining a coherent noise window from the transformed window by performing a first soft thresholding based, at least in part, on a predetermined parameter range, determining a random noise window from the transformed window by performing a second soft thresholding, and determining a time-space filtered window based, at least in part, on subtracting the coherent noise window and the random noise window from the overlapping time-space window; and determining a plurality of time-space filtered waveforms by assembling the time-space filtered window for each of the plurality of overlapping time-space windows.

2. The method of claim 1, wherein the plurality of time-space waveforms comprises seismic-while-drilling waveforms.

3. The method of claim 1, wherein the first soft thresholding comprises a difference between an amplitude of the transformed window and a predetermined threshold value.

4. The method of claim 1, wherein the second soft thresholding comprises determining a plurality of random noise threshold values from a residual window, wherein the residual window is determined from the transformed window and the coherent noise window.

5. The method of claim 4, wherein the plurality of random noise threshold values is based, at least in part, on a combination of amplitudes of the residual window.

6. The method of claim 5, wherein the plurality of random noise threshold values is a function of a temporal frequency.

7. The method of claim 1, wherein determining a filtered window comprises using a Wiener filter.

8. The method of claim 1, wherein determining the transformed window is based on performing Fourier Transforms.

9. The method of claim 1, further comprising:

refining, using a seismic processing system, a time-depth model based, at least in part, on the plurality of time-space filtered waveforms; and updating, using a wellbore planning system, a planned wellbore trajectory based, at least in part, on the time-depth model.

10. The method of claim 9, further comprising drilling a portion of a wellbore guided by the updated planned wellbore trajectory using a drilling system.

11. A non-transitory computer-readable memory comprising computer-executable instructions stored thereon that, when executed on a processor, cause the processor to perform:

obtaining a plurality of time-space waveforms;

generating a plurality of overlapping time-space windows by dividing the plurality of time-space waveforms;

for each overlapping time-space window:

determining a transformed window from the time-space window, determining a coherent noise window from the transformed window by performing a first soft thresholding based, at least in part, on a predetermined parameter range, determining a random noise window from the transformed window by performing a second soft thresholding, and determining a time-space filtered window based, at least in part, on subtracting the coherent noise window and the random noise window from the overlapping time-space window; and determining a plurality of time-space filtered waveforms by assembling the time-space filtered window for each of the plurality of overlapping time-space windows.

12. The non-transitory computer-readable memory of claim 11, further comprising computer-executable instructions for determining a filtered window using a Wiener filter.

13. A system, comprising:

a well that penetrates a hydrocarbon reservoir, bored by a drilling rig and equipped with seismic-while-drilling sensors configured to record a plurality of time-space waveforms; and, a signal processor, configured to:

obtain the plurality of time-space waveforms;

generate a plurality of overlapping time-space windows by dividing the plurality of time-space waveforms;

for each overlapping time-space window:

determine a transformed window from the time-space window, determine a coherent noise window from the transformed window by performing a first soft thresholding based, at least in part, on a predetermined parameter range, determine a random noise window from the transformed window by performing a second soft thresholding, and determine a time-space filtered window based, at least in part, on subtracting the coherent noise window and the random noise window from the overlapping time-space window; and, determine a plurality of time-space filtered waveforms by assembling the time-space filtered window for each of the plurality of overlapping time-space windows.

14. The system of claim 13, wherein the first soft thresholding comprises a difference between an amplitude of the transformed window and a predetermined threshold value.

15. The system of claim 13, wherein the second soft thresholding comprises determining a plurality of random noise threshold values from a residual window, wherein the residual window is determined from the transformed window and the coherent noise window.

16. The system of claim 15, wherein the plurality of random noise threshold values is based, at least in part, on a combination of amplitudes of the residual window.

17. The method of claim 15, wherein the plurality of random noise threshold values is a function of a temporal frequency.

18. The system of claim 13, further comprising:

a seismic processing system configured to refine a time-depth model based, at least in part, on the plurality of time-space filtered waveforms.

19. The system of claim 18, further comprising:

a wellbore planning system configured to update a planned wellbore trajectory based, at least in part, on the time-depth model.

20. The system of claim 19, further comprising:

a drilling system configured to drill a portion of a wellbore guided by the updated planned wellbore trajectory.

* * * * *